UNITED STATES PATENT OFFICE.

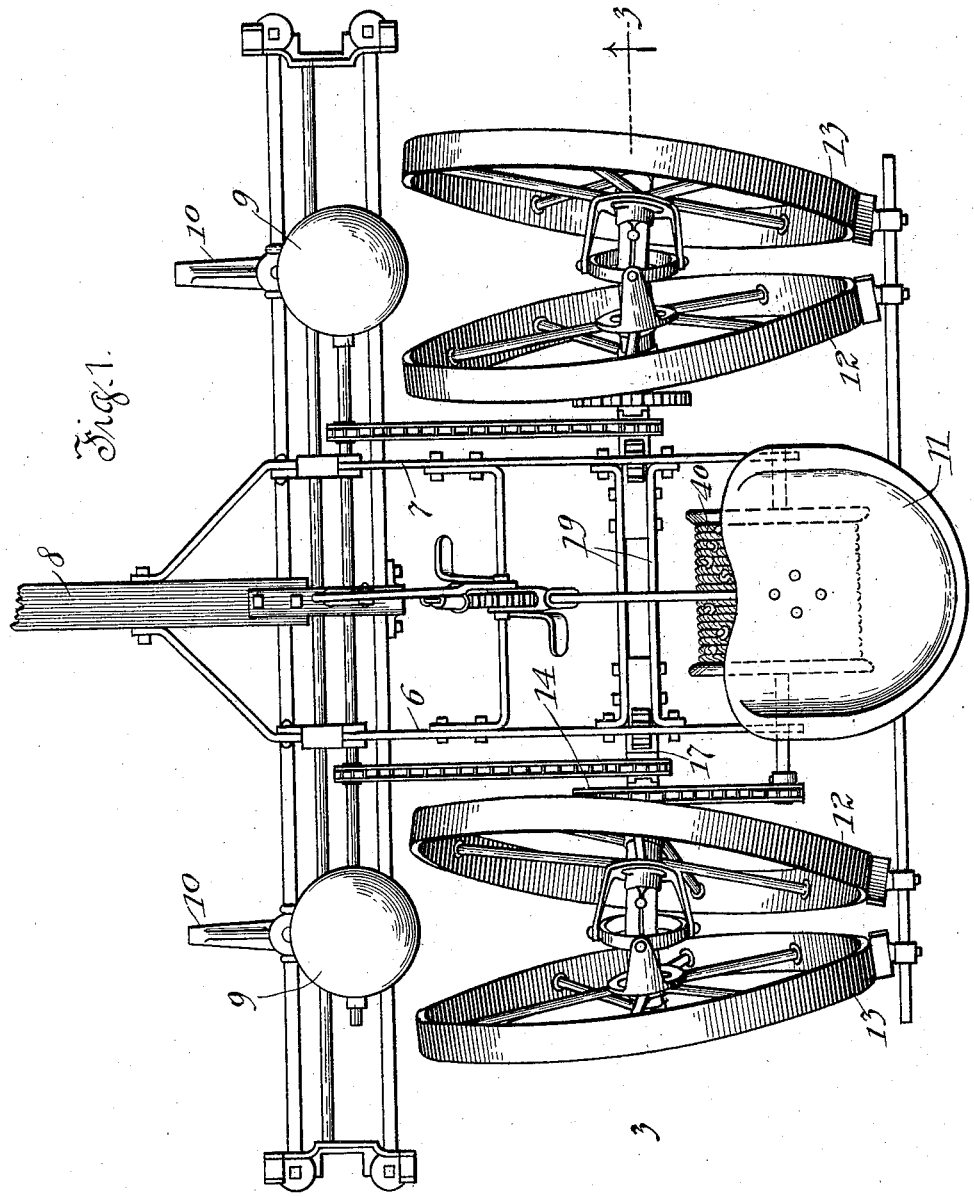

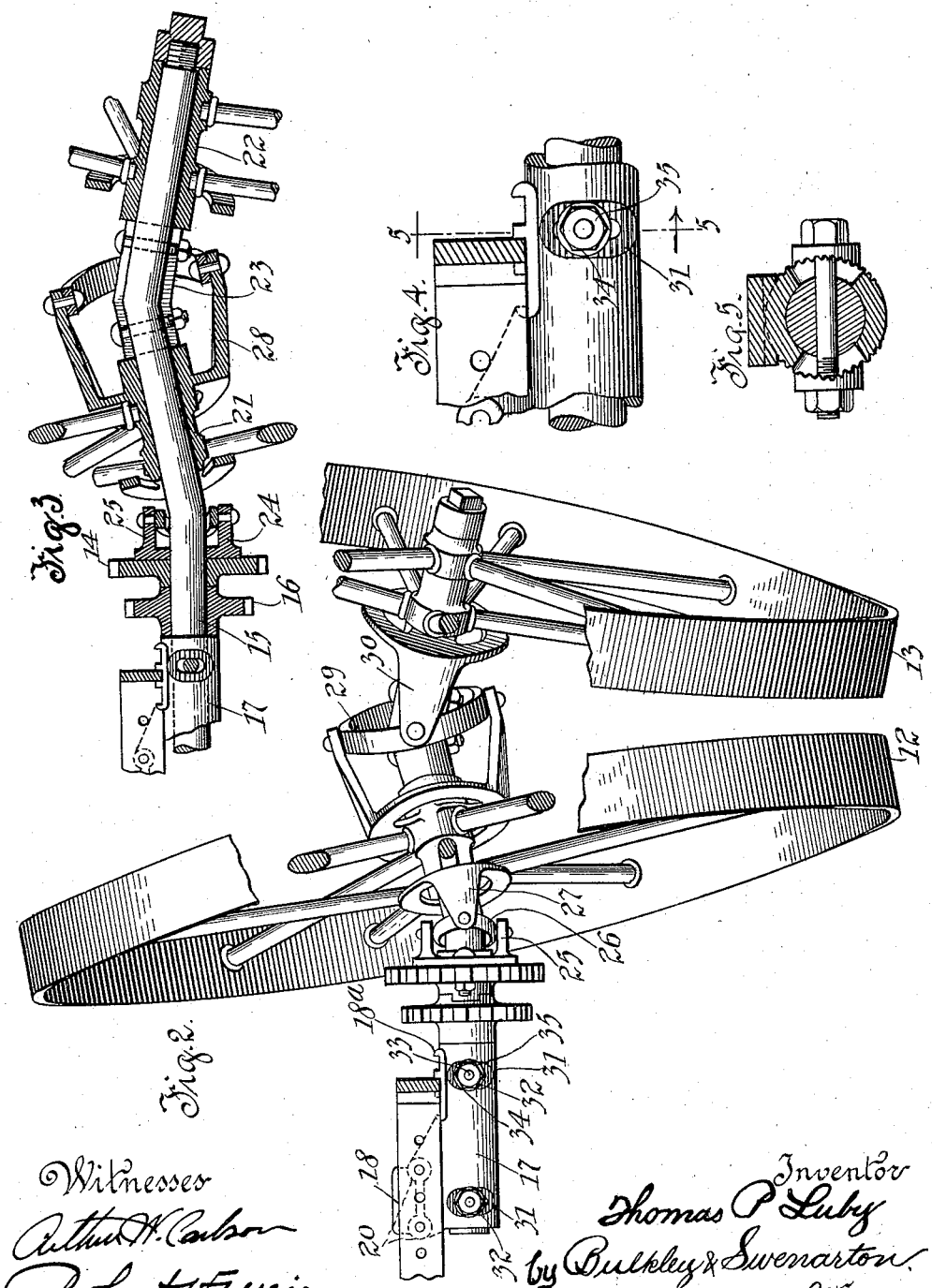

THOMAS P. LUBY, OF ROCK ISLAND, ILLINOIS, ASSIGNOR TO ROCK ISLAND PLOW COMPANY, OF ROCK ISLAND, ILLINOIS, A CORPORATION OF ILLINOIS.

CORN-PLANTER.

1,179,118.

Specification of Letters Patent.

Patented Apr. 11, 1916.

Application filed June 3, 1914. Serial No. 842,543.

*To all whom it may concern:*

Be it known that I, THOMAS P. LUBY, a citizen of the United States of America, and resident of Rock Island, Rock Island county, Illinois, have invented a certain new and useful Improvement in Corn-Planters, of which the following is a specification.

My invention relates to improvements in corn planters, and particularly to a four wheel planter in which the wheels are located in two pairs located on the opposite sides of the machine to the rear of the furrow opener and operate both as driving and as covering wheels.

The object of my invention is to provide a construction in which these wheels can be readily adjusted laterally when it is desired to vary the distance between two adjacent rows, and to also provide means whereby the wheels can be readily tilted in order to vary the opening between the same in order to properly adjust the machine for varying conditions. These and other objects of my invention will be more readily and clearly understood by having reference to the accompanying drawings in which I have illustrated one embodiment of my invention, in which—

Figure 1 is a plan view of a machine embodying the features of my invention. Fig. 2 is an enlarged detail view showing portions broken away. Fig. 3 is a detail vertical sectional view taken on a line passing through the V-shaped arbor. Fig. 4 is a detail view. Fig. 5 is a detail section on line 5—5 of Fig. 4.

As illustrated, my machine comprises the usual frame consisting of side rails 6 and 7 to which the tongue 8 is secured, which frame carries the seed hoppers 9 and furrow openers 10 and the driver's seat 11, all in the well known manner. Carried by side rails 6 and 7 are a pair of V-shaped arbors 15, projecting from opposite sides of the frame, which arbors each carry a pair of driving wheels 12 and 13. As the construction of these two arbors and the manner in which the driving wheels are mounted on the same, are similar, I will describe the construction only in connection with the right hand arbor, which is shown in detail in Figs. 3, 4 and 5. This arbor is provided with a longitudinal extension which projects through the sleeve 17, which sleeve is provided with an upwardly extending lug 18 which projects between the cross members 19, being held in position therein by a pair of bolts or pins 20. By providing a series of holes through these cross members 19, it will be seen that the sleeve and the arbor carried thereby can be readily adjusted laterally. In order to more rigidly support the sleeve 17, its upper surface is provided with a plurality of stirrups 18$^a$, one of which is adapted to receive the side rail 7 in each adjusted position. Loosely mounted on the horizontal portion of said arbor are a pair of sprockets 14 and 16, keyed together so that the operation of one will operate the other. This arbor is also provided with a V-shaped portion, as clearly shown in Figs. 2 and 3, on which the two driving wheels 12 and 13, provided with hubs 21 and 22, are loosely mounted, which hubs are separated by means of the split sleeve 23. The two driving wheels are connected together by a universal joint, and likewise sprockets 14 and 16 are connected to the sleeve 21 by a similar universal connection. These universal connections are constructed in the following manner: A member 24 is bolted to the sprocket 14 and carries a pair of laterally extending arms 25 which are pivotally connected at diametrically opposite points to a ring 26. Likewise pivotally connected to this ring are a pair of arms 27, said arms being connected to the ring at diametrically opposite points on a line extending at right angles to the line passing through the points of connections of the arms 25. These arms 27 are carried by the hub 21. This hub is likewise provided with a similar pair of arms 28 which are pivotally connected at diametrically opposite points to a ring 29. Likewise pivotally connected to this ring are a pair of arms 30 carried by the hub 22, which arms are connected at points on a line extending at right angles to the line extending through the points of connections to the arms 28.

The sleeve 17 is provided with a pair of slots 31, the marginal edges of which are provided with corrugations 32. Passing through these slots and through the arbor 15 are bolts 33 provided with corrugated washers 34 adapted to engage with the corrugations 32, being held in position by the nuts 35. By this construction it will be readily seen that by loosening the nuts 35 the arbor 15 can be angularly rotated and then held in any adjusted position by again tightening the nuts 35. By means of this angular adjustment of the arbor, the angularity or tilting of the wheels can be varied, and in this manner the point of application of the opening between the wheels varied as well as the extent of these openings in order to adjust the wheels for varying conditions, the universal connections permitting the wheels to operate freely in any of the adjusted positions.

As previously stated, the construction of the arbor and the mounting of the wheels thereon on the other side of the machine is the same as that just described. The winding reel 40 is conveniently located underneath the driver's seat 11, being driven by suitable chain and sprocket connections from the sprocket.

In operation, all the wheels are employed as driving wheels, and they can be readily adjusted laterally by merely adjusting the position of the lug 18 carried by the sleeve 17 with respect to the transverse bars 19. Likewise, when it is desired to vary the tilt of the wheels, it is merely necessary to loosen the nuts 35 and angularly adjust the arbor 15, and then again lock the arbor in this adjusted position.

It will thus be seen that I have devised a very efficient structure in which all four of the wheels can be readily adjusted to suit varying requirements. It will likewise be noted that the driving reel is conveniently mounted underneath the driver's seat and is driven from the driving wheels.

While I have illustrated and described one specific embodiment of my invention, it will, of course, be understood that I do not wish to limit myself to the exact construction shown and described but various modifications and changes will readily suggest themselves to those skilled in the art without departing in any way from the spirit of my invention.

What I claim as my invention is:

1. The combination of a frame, bearing members laterally adjustable thereon, an arbor mounted in each of said bearings and rotatable therein to vary the angular positions of the arbor, means for fastening said arbors in said bearings in their adjusted positions, a pair of wheels mounted on each of said arbors, a sprocket carried on each arbor, a universal joint between said sprockets and one of the wheels of each pair, and another universal joint between the wheels of each pair.

2. The combination of a planter frame having crossed members spaced apart, arbor supporting members positioned between said cross members and adjustable therein, V-shaped arbors carried by said supporting members and rotatably adjustable therein, a pair of wheels on each of said arbors, a sprocket wheel on each of said arbors between the inner wheel of each pair and the frame, a universal connection between the sprocket and the inner wheel of each pair, and another universal connection between the wheels of each pair.

Signed by me at Rock Island, Illinois, this 29th day of May, 1914.

THOMAS P. LUBY.

Witnesses:
W. C. SCHMIDT,
E. L. BLADEL.

Copies of this patent may be obtained for five cents each, by addressing the "Commissioner of Patents, Washington, D. C."